E. N. FONTNEAU.
SOFT COLLAR HOLDER.
APPLICATION FILED AUG. 12, 1920.

1,376,372. Patented Apr. 26, 1921.

Inventor
Earle N. Fontneau
By Joseph A. Miller
Attorney

UNITED STATES PATENT OFFICE.

EARLE N. FONTNEAU, OF ATTLEBORO, MASSACHUSETTS.

SOFT-COLLAR HOLDER.

1,376,372.   Specification of Letters Patent.   Patented Apr. 26, 1921.

Application filed August 12, 1920. Serial No. 403,166.

*To all whom it may concern:*

Be it known that I, EARLE N. FONTNEAU, a citizen of the United States, residing at Attleboro, in the county of Bristol and State of Massachusetts, have invented new and useful Improvements in Soft-Collar Holders, of which the following is a specification.

This invention relates to certain new and useful improvements in soft collar holders and the primary object of the invention is to provide a holder of this type which has button heads and shanks therefor, the latter formed of integral extensions of the two adjustable members which form the connections between the heads, and aims to further provide shanks which are of the same width as that of the members for purpose of increased strength.

A further object of the invention is to provide a holder in which long supports for the button heads are provided, which supports more specifically are formed by the relatively wide end edges of the members.

Still further, the invention aims to provide a structure of this kind which is simple in construction and which can be easily and quickly produced and at a low cost.

Figure 1:
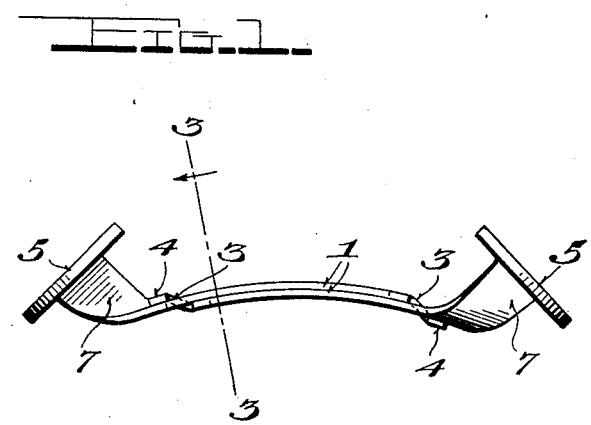
Figure 1 is a side elevation of the invention.
Figure 2:
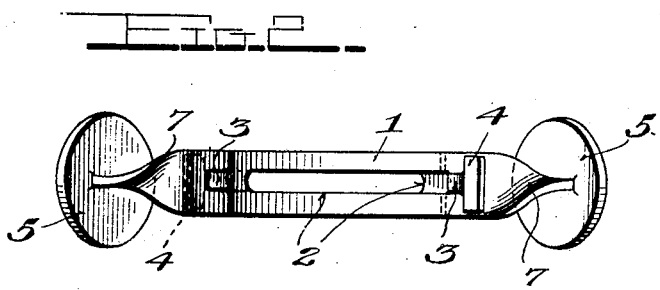
Fig. 2, is a bottom plan view.
Figure 3:
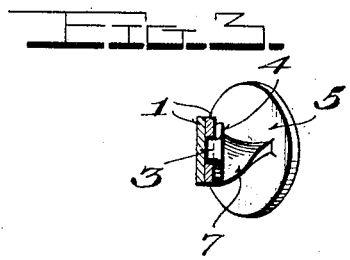
Fig. 3, is a section on line 3—3 of Fig. 1.

In proceeding in accordance with the present invention, a pair of flat strips possessed of relatively large widths are employed, the strips being designated 1, and each having a longitudinal slot 2, and also having the free or inner ends thereof contracted to form necks 3, the outer ends of which carry heads or cross-bars 4, the necks being somewhat inclined and extending through the slot of the opposed member so as to thus adjustably connect the members. Friction is relied upon to hold the members adjusted.

The outer ends of the strips are twisted 90°, and inclined as shown to form shanks 7, to thus impart a forwardly converging relationship between the button heads 5, which are secured to the outer or free end edges of the shanks of the strips. These end edges are given the inclination depicted in the drawings by the twisting and divergent disposition of the ends.

The button heads 5, are simply soldered to the end edges of the members, and due to the widths of the strips it will be apparent that a substantial and effective area for soldering is provided, holding the button heads rigidly and firmly in place. In addition, the outer head 4, will engage the base of the shank 7, of the outer member and will thus restrict contractile movement of the shanks.

The shanks are thus formed strong and effective for the purpose, since they not only have material widths but in addition the twisting reinforces and strengthens same.

Having thus described my invention, what I claim as new and desire to secure by Letters Patent is:—

1. A soft collar holder composed of a pair of relatively wide strips having their inner ends interconnected and slidable for adjustment and having their outer ends twisted and inclined to form wide button shanks, and button heads soldered to the outer free end edges of the strips.

2. A soft collar holder composed of a pair of strips having their inner ends slidably connected and having their outer ends inclined and button heads affixed to the outer end edges of the outer ends of the strips.

3. A soft collar holder composed of a pair of members slidably connected at their inner ends and having their outer ends turned at an angle, and button heads affixed to the outer ends of the members.

4. A soft collar holder composed of a pair of strips slidably connected at their inner ends and having their outer ends twisted and disposed at an incline, and button heads affixed to the outer ends, one of the twisted outer ends being disposed so as to engage the inner end of the other member to limit contractile movement of the members.

In testimony whereof I have signed my name to this specification in the presence of two subscribing witnesses.

EARLE N. FONTNEAU.

Witnesses:
 E. P. TOOMEY,
 J. A. MILLER.